United States Patent Office 3,259,505
Patented July 5, 1966

3,259,505
SEASONING FOODS WITH MONOSODIUM
L-HOMOCYSTEINATE AND PRODUCT
Takeo Kaneko, Higashisumiyoshi-ku, Osaka-shi, Osaka-fu, Bunichi Toi, Yokohama-shi, Kanagawa-ken, and Shingo Ikeda, Bunkyo-ku, Tokyo-to, Japan, assignors to Ajinomoto Kabushiki Kaisha, Tokyo, Japan, a corporation of Japan
No Drawing. Filed July 26, 1961, Ser. No. 126,857
Claims priority, application Japan, Aug. 3, 1960,
35/33,445
5 Claims. (Cl. 99—140)

The present invention relates to processes for producing and using seasonings and further relates to associated products.

In accordance with the invention, there is proposed a process for preparing novel seasonings which comprises mixing L-homocysteic acid, i.e., L-α-amino-γ-sulfobutyric acid with sodium hydroxide, sodium hydrogen carbonate or sodium carbonate in an aqueous solution and, if desired, separating the monosodium L-homocysteinate which is produced.

It is an object of the invention to supply such novel seasonings easily and economically.

In a study of the interrelation between physical properties such as taste, flavoring effect, chemical structure, and configuration of amino acids, it has been discovered that monosodium L-homocysteinate has a flavoring effect which is similar but superior to that of monosodium L-glutamate.

A process for synthesizing homocysteic acid has been known since 1932 (V. du Vigneaud et al., J. Biol Chem., 99, 135 (1932–3)), but was abandoned since a use for the acid was not found. Currently, almost no descriptive material on the physical characteristics of this acid, besides the melting point thereof, can be obtained. However, as a result of the aforesaid study of this acid it has been found that, even though its taste is characterized by a slight sweetness and substantial sourness, an equimolar mixture of L-homocysteic acid and sodium hydroxide or monosodium homocysteate has a sweetness similar to that of monosodium L-glutamate. We have also found that the sweetness of monosodium L-homocysteinate is stronger than that of monosodium L-glutamate.

The results of comparative tests of flavoring effect of monosodium L-homocysteinate (sometimes referred to as MSH hereinafter) with that of monosodium L-glutamate (sometimes referred to as MSG hereinafter) are as follows:

(1) Measurement of threshold value: Samples of aqueous solutions of monosodium L-homocysteinate were prepared in the concentrations indicated in the following table.

| Sample No. | 1 | 2 | 3 | 4 | 5 | 6 | 7 | 8 |
|---|---|---|---|---|---|---|---|---|
| Concentration (Percent) | 0.1200 | 0.0600 | 0.0300 | 0.01500 | 0.0075 | 0.0038 | 0.0019 | 0 |

Samples Nos. 1 to 8 were given to each member of a taste test panel consisting of ten members selected from a regular taste test panel consisting of eighty members. Each member of the panel was asked to rank said samples according to the strength of sweetness thereof. The results were as follows:

| Judgment | Sample No. | | | | | | | |
|---|---|---|---|---|---|---|---|---|
| | 1 | 2 | 3 | 4 | 5 | 6 | 7 | 8 |
| Number of members who ranked as— | | | | | | | | |
| 1st | 10 | 0 | 0 | 0 | 0 | 0 | 0 | 0 |
| 2d | 0 | 10 | 0 | 0 | 0 | 0 | 0 | 0 |
| 3d | 0 | 0 | 10 | 0 | 0 | 0 | 0 | 0 |
| 4th | 0 | 0 | 0 | 9 | 0 | 0 | 1 | 0 |
| 5th | 0 | 0 | 0 | 0 | 2 | 4 | 1 | 3 |
| 6th | 0 | 0 | 0 | 0 | 1 | 3 | 3 | 3 |
| 7th | 0 | 0 | 0 | 0 | 5 | 2 | 3 | 0 |
| 8th | 0 | 0 | 0 | 1 | 2 | 1 | 2 | 4 |
| Total rankings | 10 | 20 | 30 | 44 | 67 | 60 | 64 | 64 |

From the foregoing table, it appears that Samples Nos. 5–7 are undistinguishable from Sample No. 8, i.e., distilled water containing no MSH. Accordingly it appears that the threshold value of MSH is 0.015% in an aqueous solution. As a result of similar tests, the threshold value of MSG is found to be 0.03%.

Accordingly, the threshold value of MSH is a half that of MSG.

(2) Measurement of strength of sweetness: The following tests were carried out in order to find what concentration of MSG aqueous solution corresponds to a 0.1% solution of MSH.

(a) Experimentation by ranking method: The ranking of the strength of sweetness by a regular taste test panel consisting of fifty-two members as to five samples was as follows:

SAMPLE AQUEOUS SOLUTIONS

| Sample No. | S | 1 | 2 | 3 | 4 |
|---|---|---|---|---|---|
| MSH concentration (percent) | 0.1 | 0 | 0 | 0 | 0 |
| MSG concentration (percent) | 0 | 0.3 | 0.2 | 0.1 | 0.05 |

JUDGMENT RESULT

| Judgment | Sample No. | | | | |
|---|---|---|---|---|---|
| | S | 1 | 2 | 3 | 4 |
| Number of members ranking as— | | | | | |
| 1st | 6 | 42 | 3 | 1 | 0 |
| 2d | 11 | 7 | 33 | 1 | 0 |
| 3d | 31 | 2 | 13 | 1 | 5 |
| 4th | 4 | 0 | 3 | 39 | 6 |
| 5th | 0 | 1 | 0 | 10 | 41 |
| Total rankings | 137 | 67 | 120 | 212 | 244 |
| Average | 2.63 | 1.29 | 2.31 | 4.08 | 4.69 |
| Ranking | (3) | (1) | (2) | (4) | (5) |

F-test: $W=0.7666$, $F_0=158.53$ $\varphi_1=4$, $\varphi_2=202$, 1% significant.

Accordingly, an aqueous solution of 0.1% of MSH is presumed to correspond to an aqueous solution of about 0.18% of MSG.

The foregoing method can determine relative ranking, but does not measure the strength of taste quantitatively. The measurement of the strength of taste was carried out by the following pair-test.

(b) Experimentation by pair-test: (i) MSH aqueous solution to which is added sodium chloride (table-salt)—

SAMPLE SOLUTIONS
[Concentrations in a solution of 1% of sodium chloride]

| Sample No. | S | 1 | 2 | 3 | 4 | 5 |
|---|---|---|---|---|---|---|
| MSH concentration (percent) | 0.1 | 0 | 0 | 0 | 0 | 0 |
| MSG concentration (percent) | 0 | 0.14 | 0.16 | 0.18 | 0.20 | 0.22 |

The foregoing Samples Nos. S and 1–5 were given to the taste test panel employed in the measuring the threshold value, and the judgment of the strength of sweetness by the pair-test as to all the combinations such as (S, 1), (S, 2) . . . (S, 5) was as follows:

| Judgment | Sample No. | | | | |
|---|---|---|---|---|---|
| | 1 | 2 | 3 | 4 | 5 |
| Number of members who judged S stronger | 7 | 5 | 4 | 2 | 1 |
| Number of members who judged the same | 2 | 0 | 1 | 0 | 0 |
| Number of members who judged S weaker | 1 | 5 | 5 | 8 | 9 |
| Level of Significance | * | | | ** | *** |

In the foregoing table, the level of significance shows the result of the F-test. The marks "* * *" "* *" and "*" indicate 0.1, 1.0 and 5.0%-significance, respectively.

(ii) MSH aqueous solution to which is added sodium chloride (table-salt) as well as soybean sauce—

SAMPLE SOLUTION
[Concentration in an aqueous solution to which is added 1% of sodium chloride and 5 ml./l. of soybean sauce]

| Sample No. | S | 1 | 2 | 3 | 4 | 5 | 6 | 7 |
|---|---|---|---|---|---|---|---|---|
| MSH concentration (percent) | 0.1 | 0 | 0 | 0 | 0 | 0 | 0 | 0 |
| MSG concentration (percent) | 0 | 0.10 | 0.12 | 0.14 | 0.16 | 0.18 | 0.20 | 0.22 |

As to the foregoing samples, a test similar to that described in (i) was carried out. The results were as follows:

| Judgment | Sample No. | | | | | | |
|---|---|---|---|---|---|---|---|
| | 1 | 2 | 3 | 4 | 5 | 6 | 7 |
| Number of members who judged S stronger | 9 | 10 | 6 | 4 | 0 | 1 | 0 |
| Number of members who judged S weaker | 1 | 0 | 4 | 6 | 10 | 9 | 10 |
| Level of significance | *** | *** | | | *** | *** | *** |

The addition of sodium chloride and soybean sauce to the solution of the samples is intended for imitating actual cases such as those in which the novel seasonings of the present invention are used in actual cooking. From the above table, it is understood that the strength of sweetness of the 0.1% solution of MSH corresponds to that of the 0.14–0.16% of MSG.

(3) Comparison of characters of sweetness by triple-test:

SAMPLE SOLUTIONS
[Concentration in an aqueous solution to which is added 1% of table-salt and 5 ml./l. of soybean sauce]

| Sample No. | S | 1 | 2 | 3 |
|---|---|---|---|---|
| MSH concentration (percent) | 0.1 | 0 | 0 | 0 |
| MSG concentration (percent) | 0 | 0.14 | 0.16 | 0.18 |

The foregoing samples were tested by a taste test panel consisting of ten members as to the combinations indicated in the following table. The results were as follows:

| Combination | Judgment | |
|---|---|---|
| | Number of correct reply | Level of significance |
| (S.1.1) | 7 | * |
| (S.S.1) | 7 | * |
| (S.2.2) | 9 | *** |
| (S.S.2) | 8 | ** |
| (S.3.3) | 4 | x |
| (S.S.3) | 5 | x |

From the above table, it is seen that it was difficult for the panel members to distinguish the 0.1% solution of MSH from the 0.18% solution of MSG in taste and it can thus be said that there is no substantial difference in sweetness between the compared solutions.

(4) From the foregoing results it appears that the threshold value for an MSH aqueous solution is 0.015% which equals ½ that of an MSG solution and that, in respect of the strength of sweetness, the 0.1% aqueous solution of MSH corresponds to the 0.15–0.17% aqueous solution of MSG and furthermore their tastes are substantially similar to each other.

MSH which has a smaller threshold value and a strength of sweetness which is superior to that of MSG is consequently a remarkably superior seasoning.

As a result of actual tasting of soybean sauce soup (consomme), bean paste soup (potage), and other soups and other dishes using MSH and MSG respectively, it was determined that MSH has a flavoring effect similar to that of MSG.

The novel seasoning of the present invention is prepared by mixing and neutralizing L-homocysteic acid with sodium hydroxide, sodium hydrogen carbonate or sodium carbonate in an aqueous solution. In the case of neutralization of L-homocysteic acid with sodium hydroxide or sodium hydrogen carbonate, it is preferable to use them in an equimolar quantity and, in the case of neutralization with sodium carbonate, it is preferable to use it in the ratio of a half of the acid.

The solution thus obtained can be used as it is in order to strengthen the sweetness of liquid seasonings such as soybean sauce and of liqueur, soups, and so forth. Furthermore MSH, isolated as crystals by conventional process, e.g., concentration of or the addition of alcohol to the solution, may be used as a seasoning.

*Example 1*

To a solution of 4 g. of sodium hydroxide in 50 ml. of water were added 18 g. of L-homocysteic acid and the solution was agitated to produce a clear solution. After separating about 0.8 ml. from the solution obtained, the remaining portion was concentrated by evaporating water under reduced pressure and, after removal of about 40 ml. of water, 20 ml. of ethanol was added to the residue. The crystals formed were filtered and dried. Nineteen gram of MSH were obtained.

The previously separated solution was added to a bowl of soybean sauce soup (consomme). The said soup was determined to show a sweetness similar to that of soybean soup to which was added MSG instead of MSH.

The spatulas of the crystals obtained in the present example were added to a bowl of bean paste soup (potage) and a sweetness similar to that of the case of the soybean sauce soup (consomme) was recognized.

*Example 2*

Chicken noodle soup mix having the following ingredients was prepared by using crystals of MSH obtained by the process of this invention.

| | Percent |
|---|---|
| Salt | 42.50 |
| MSH | 10.85 |
| Chickent fat | 19.63 |
| Dehydrated chicken | 15.75 |
| Wheaten base | 3.65 |
| Onion powder | 3.05 |
| Sugar | 1.95 |
| Protex No. 5 powder | 1.52 |
| Dried parsley | 0.61 |
| Ground white pepper | 0.25 |
| Ground turmeric | 0.24 |

It was found that the sweetness of said soup mix was identical with that of a soup having monosodium L-glutamate in an amount twice the quantity of MSH.

*Example 3*

Meat soup mix having the following ingredients was prepared by using crystals of MSH obtained by the process of this invention.

| | Percent |
|---|---|
| Beef powder | 23.30 |
| Wheat flour | 23.30 |
| Carrot powder | 23.38 |
| Onion powder | 17.40 |
| Salt | 8.78 |
| Beef fat | 1.92 |
| MSH | 0.82 |
| Protex No. 5 powder | 0.88 |
| Ground white pepper | 0.14 |
| Caramelline powder H6168 | 0.08 |

It was found that the sweetness of said soup mix was identical with that of a soup having monosodium L-glutamate in an amount twice the quantity of MSH.

*Example 4*

Chicken boullion having the following ingredients was prepared by using crystals of MSH obtained by the process of this invention.

| | |
|---|---|
| Chicken soup stock, ml. | 1000 |
| White pepper, g. | 0.29 |
| Salt, g. | 1.62 |
| Edible gelatine, g. | 4.87 |
| MSH, g. | 2.82 |

It was found that the sweetness of said boullion was identical with that of a boullion having monosodium L-glutamate in an amount twice the quantity of MSH.

We claim:

1. A method comprising adding monosodium L-homocysteinate to a foodstuff in a seasoning quantity.

2. A method comprising adding monosodium L-homocysteinate in crystal form to a foodstuff in a seasoning quantity.

3. A method comprising adding monosodium L-homocysteinate in aqueous solution to a foodstuff in a seasoning quantity.

4. A product comprising a foodstuff and monosodium L-homocysteinate in seasoning quantity.

5. A product comprising a meat soup and a seasoning quantity of monosodium L-homocysteinate.

References Cited by the Examiner

UNITED STATES PATENTS 3,109,741   11/1963   Toi et al. ———— 99—16 X

OTHER REFERENCES

Butz et al., "The Formation of a Homologue of Cystine by the Decomposition of Methionine With Sulfuric Acid," Journal of Biological Chemistry, vol. 99, No. 1 (December 1932), pp. 135–142 (pp. 141–142 relied on).

"Monosodium Glutamate as a Chemical Condiment," by Han, Industrial and Engineering Chemistry, vol. 21, No. 10, October 1929, pages 984–987.

"Monosodium Glutamate," by Aries et al., Chemical Engineering, December 1949, page 285.

"The Chemical Senses," by Moncrieff, Leonard Hill Limited, 17 Stratford Place, W.I., 1944, pages 107, 108, 238 and 266.

"The Merck Index," seventh edition, published by Merck & Co., Inc., Rahway, N.J., 1960, page 523.

A. LOUIS MONACELL, *Primary Examiner.*

BEATRICE H. STRIZAK, *Examiner.*

J. M. GOLIAN, *Assistant Examiner.*